(12) United States Patent
Kemmet et al.

(10) Patent No.: US 8,478,082 B2
(45) Date of Patent: Jul. 2, 2013

(54) SAGNAC INTERFEROMETRIC SWITCH UTILIZING FARADAY ROTATION

(75) Inventors: Sasha N. Kemmet, Adel, IA (US); Jin-Wei Tioh, Ames, IA (US); Mani Mina, Ames, IA (US); Robert J. Weber, Boone, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 323 days.

(21) Appl. No.: 12/845,943

(22) Filed: Jul. 29, 2010

(65) Prior Publication Data

US 2011/0026869 A1 Feb. 3, 2011

Related U.S. Application Data

(60) Provisional application No. 61/229,959, filed on Jul. 30, 2009.

(51) Int. Cl.
*G02F 1/095* (2006.01)
*G02F 1/295* (2006.01)

(52) U.S. Cl.
USPC .................. 385/6; 385/11; 385/23; 359/280; 359/281

(58) Field of Classification Search
USPC ............ 385/6, 11, 16, 23; 359/280–281
See application file for complete search history.

(56) References Cited

U.S. PATENT DOCUMENTS

| | | | | |
|---|---|---|---|---|
| 5,053,885 A | * | 10/1991 | Telle | 358/449 |
| 5,357,359 A | * | 10/1994 | Uchiyama et al. | 398/75 |
| 5,365,531 A | * | 11/1994 | Lin et al. | 372/18 |
| 6,480,644 B1 | * | 11/2002 | MacDonald | 385/16 |
| 6,580,546 B2 | * | 6/2003 | Liu et al. | 359/280 |
| 6,958,845 B2 | * | 10/2005 | Hiironen et al. | 359/281 |
| 7,035,497 B2 | | 4/2006 | Li et al. | |
| 7,555,177 B1 | * | 6/2009 | Bahuguna et al. | 385/16 |
| 2005/0117218 A1 | * | 6/2005 | Xiang et al. | 359/484 |

OTHER PUBLICATIONS

Jin-Wei Tioh et al., "Field Coil for Magneto-Optic . . . ", publication, 2008, 4 pages, pp. 3843-3846, IEEE Transactions on Magnetics, vol. 44, No. 11, Nov. 2008.

Jin-Wei Tioh et al., "Design of an Integrated Magneto-optic . . . ", publication, 2009, 4 pages, pp. 1-4, Presented at: IEEE InterMag Conference May 4-8, 2009 Sacramento CA 3654.

Lilin Yi et al., "A Polarization-Independent Subnanosecond . . . ", publication, 2008, 3 pages, pp. 539-541, IEEE Photonics Technology Letters, vol. 20, No. 8, Apr. 15, 2008.

(Continued)

*Primary Examiner* — Daniel Petkovsek
(74) *Attorney, Agent, or Firm* — Reinhart Boerner Van Deuren P.C.

(57) ABSTRACT

A fiber-based, magneto-optic (MO) optical modulator or switch based on Sagnac interferometry is provided. The system uses a magneto-optic Faraday rotator (MOFR) to produce optical modulation with low magnetic fields. The Sagnac geometry allows for increased modulation at lower fields than traditional MO modulators. This switch uses the MOFR to create different states of polarization in counter-propagating waves, which results in interference at the output port. A magnetic field is used to control the amount of rotation in the state of polarization (SOP), and therefore, the ON-OFF extinction ratio.

21 Claims, 5 Drawing Sheets

OTHER PUBLICATIONS

Masahiko Jinno et al., "Nonlinear Sagnas Interferometer . . . ", publication, 1992, 8 pages, pp. 875-882, IEEE Journal of Quantum Electronics, vol. 28, No. 4, Apr. 1992.

Sasha Kemmet et al., "Sagnac interferometric switch . . . ", publication, 2009, 3 pages, pages, Journal of Applied Physics 105, 07E702 (2009).

Sasha Kemmet et al., "Fiber-based Magneto-optic . . . ", paper, 2009, 4 pages, pp. 1-4.

Sasha Kemmet et al., "Current-controlled, High-speed . . . ", paper, 4 pages, pp. 1-4, known prior to Jul. 29, 2010.

* cited by examiner

SAGNAC INTERFEROMETRIC SWITCH UTILIZING FARADAY ROTATION

CROSS-REFERENCE TO RELATED PATENT APPLICATIONS

This patent application claims the benefit of U.S. Provisional Patent Application No. 61/229,959, filed Jul. 30, 2009, the entire teachings and disclosure of which are incorporated herein by reference thereto.

FIELD OF THE INVENTION

This invention generally relates to optical switches using a Sagnac interferometer, and more particularly to fiber magneto-optic switches providing high speed, high bandwidth, all-optical switching.

BACKGROUND OF THE INVENTION

As fiber-optic system research and use increase, there has been growing interest in developing fiber-based technology for switching, modulation, and system control. Magneto-optic (MO) fiber-based switches have been proposed and studied due to their low insertion loss, possibilities to be integrated into optical systems, large optical cross section (i.e. a majority of the fiber energy is captured by the MO), and the nonreciprocity of the induced rotation. Also, unlike electro-optic or MEMS which can have problem when switching high-power beams due to heat, magneto-optic can handle more power and maintain its switching integrity. These qualities also make MO materials attractive for use in optical modulators. In addition, recent fabrication and control advances of bismuth-substituted iron garnet single domain arrays, growth techniques, and optical circuit integration show promising results for use of magneto-optic materials in integrated high speed systems. In addition, optical switching with MO materials can be achieved with low operating voltages and is polarization independent.

In the non-magneto-optic realm, there has been work on optical modulators and switches using a Sagnac and Mach-Zehnder interferometers. A Sagnac interferometer is a closed loop interferometer. The Sagnac interferometer was originally used by Georges Sagnac in 1913 to test for the existence of "luminiferous ether" via an effect now named the Sagnac effect. Though the interferometer is often associated with the Sagnac effect, it has many applications independent of its original application. With the development of optical fiber and fiber optic couplers, a new generation of Sagnac devices has been created, primarily as resonators, sensors, and gyroscopes.

Traditionally, switching time of magneto-optic switches has been slow, in the hundreds of microseconds range. However, with the availability of optics-grade orthoferrites, the switching time of magneto-optic devices can be greatly reduced. Additional improvements in switching speed can be obtained by using domain wall motion for the switching mechanism. In addition to advances in magneto-optic switching time, recent advances in fabrication of magneto-optic materials, growth techniques, optical circuit integration, and the experimental realization of magneto-optical photonic crystals show promising results for use of magneto-optic materials in integrated high speed systems.

Embodiments of the invention provide an improved optical switch using the benefits provided by a Sagnac interferometer with the control of a magneto-optic device. These and other advantages of the invention, as well as additional inventive features, will be apparent from the description of the invention provided herein.

BRIEF SUMMARY OF THE INVENTION

Embodiments of the present invention provide a magneto-optic (MO) fiber-based optical modulator (switch) which uses a Sagnac interferometer configuration. Embodiments of the modulator use a magneto-optic Faraday rotator (MOFR) and an external magnetic field to control the amount of interference at the output port of the modulator. Due to the Sagnac configuration, the difference in the rotation in the plane of polarization of the two waves is effectively doubled from a traditional MO modulator. Therefore, this configuration allows for a greater degree of modulation with application of small magnetic fields.

In one embodiment, an optical switch utilizing a magneto-optic Faraday rotator (MOFR) capable of sub-microsecond switching includes an optical circuit and supporting electronic circuitry. Preferably, the MOFR is a bismuth substituted iron garnet (BIG) material, although other embodiments may use other Faraday rotators know in the art. High optical switching speeds are accomplished through the design of an electronic circuit capable of creating high-speed magnetic pulses necessary to induce the Faraday effect. The strength of the magnetic field determines the output power at each output port of the switch. Rise times of less than 75 ns for 40 Oe magnetic fields are achieved for optical circuit control.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As discussed briefly above, as demand for optical data and communication networks grow, there is an increasing need for high speed, high bandwidth, all-optical switching technologies. Magneto-optic based switches have low insertion loss and possibilities to be integrated into optical systems, and offer a promising way to create high speed switching in fiber systems. Other fiber, non-magneto-optic switches have also been proposed using Sagnac and Mach-Zehnder interferometers. As described in detail below, embodiments of the present invention, one of which is illustrated in FIG. 1, provide a magneto-optic switch 100 utilizing a Sagnac interferometer 102.

In one embodiment, this switch 100 uses a magneto-optic Faraday rotator (MOFR) 104 to control the state of polarization in counter-propagating waves, which results in interference at the output port 106. A magnetic field 108 is used to control the amount of rotation in the state of polarization (SOP), and therefore, the ON-OFF extinction ratio.

Because the output of interferometers is significantly affected by all of the losses and reflections in the system, understanding and controlling various mismatches play a significant role in the device performance. As such, an analytical model is used to study the system. This analytical model includes the reflections at the magnetic-optical interfaces and predicts the phase shift and extinction ratio of an embodiment of the system of the present invention.

Figure 1:
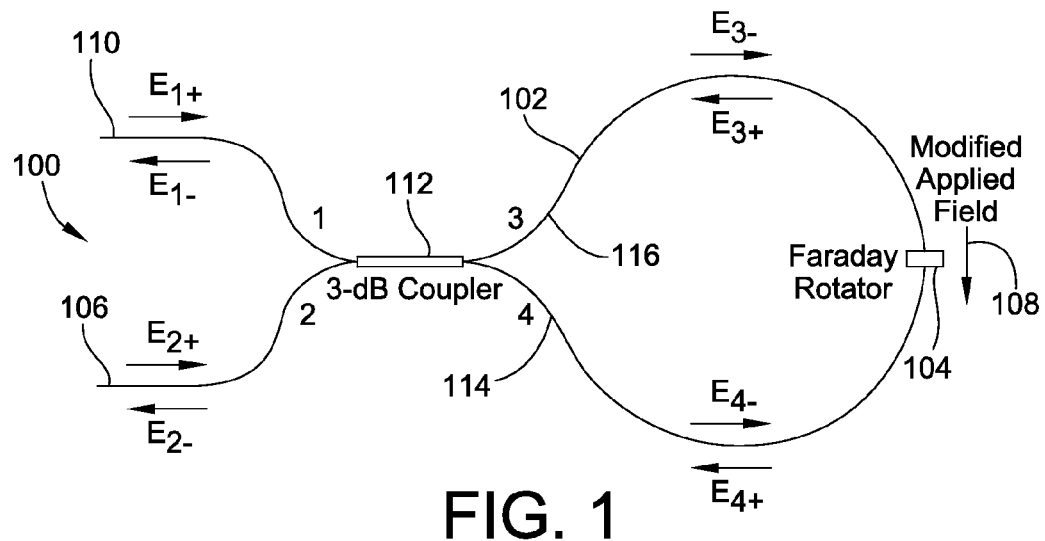
FIG. 1 is a simplified single line diagram of an embodiment of a Sagnac interferometric modulator (switch) utilizing Faraday rotation constructed in accordance with the teachings of the present invention.

In the embodiment of the switch 100 utilizing a Sagnac interferometer 102 with a MOFR 104 in the loop as shown in FIG. 1, port 1 is treated as the input port 110 and port 2 as the output port 106. In this switch 100, a 3-dB coupler 112 is used to split the input signal into two counter-propagating waves that travel in opposite directions around the loop of the Sagnac interferometer 102. In other embodiments, the function of the coupler 112 may be performed by a power splitter device known in the art that is substantially lossless, and as such use of the term coupler herein should be taken to include power splitters as well. These waves are linearly polarized or a superposition of linear polarized components and approximately equal in amplitude. A $\pi/2$ phase shift is induced by the coupler 112 in the beam which passes from port 1 (input port 110) to port 4 (114) relative to the beam which passes from port 1 (input port 110) to port 3 (116). In the absence of any difference introduced between the two propagating beams, complete destructive interference will occur at port 2 (the output port 106) and the input power will be returned to the port 1 (input port 110).

In this embodiment of the switch 100, a bismuth substituted iron garnet Faraday rotator 104 [$(Bi_{1.1}Tb_{1.9})(Fe_{4.25}Ga_{0.75})O_{12}$] is placed in the loop and the bias magnetic field 108 through it is controlled by an external circuit. Due to the non-reciprocal nature of Faraday rotation, the polarization of the light traveling in opposite directions will undergo rotation approximately equal in amplitude but opposite in sign. The degree of rotation determines the amount of interference at the output port 106, and thus, an ON and OFF state can be achieved.

The switch 100 may either have a latching or non-latching configuration. In a latching configuration, a magnetic pulse needs to be large enough to saturate the magnetic material and the output will be delivered to port 2 (output port 106) until a large enough reverse field is supplied. In a non-latching setup, the signal is varied and controlled by an external applied field, as long as saturation is avoided.

As will be recognized by those skilled in the art, a simple Sagnac interferometer without a MOFR works by splitting an incoming wave (at the input port 1) into two counter-propagating waves. The output (at the output port 2) will vary based on the path difference introduced between the two counter-propagating waves. Ideally, when the path traveled by the two waves is identical, there is no output at port 2. The output at port 2 initially increases as the difference in the traveled paths increase and will undergo sinusoidal variations with the output reaching a maximum when the paths differ by integer multiples of the half-wavelength. At port 1, the output will be maximized when there is no path difference or they differ by integer multiples of the wavelength.

Returning again to FIG. 1, a linearly polarized incoming beam (designated $E_{1+}$) is split into two counter-propagating beams of equal magnitude, $E_{3-}$ and $E_{4-}$ by the 3-dB coupler 112. As used herein, a wave entering a port will be denoted with "+" and a wave leaving a port will be denoted with "−". As stated above, the phase difference introduced by the coupler 112 between the two beams is $\pi/2$. The action of the coupler 112 can be described using a Jones matrix as $$\begin{pmatrix} E_{3-} \\ E_{4-} \end{pmatrix} = \frac{1}{\sqrt{2}} \begin{pmatrix} 1 & j \\ j & 1 \end{pmatrix} \begin{pmatrix} E_{1+} \\ E_{2+} \end{pmatrix} \quad (1)$$

where $E_{1+}$ and $E_{2+}$ are the signals entering ports 1 (input port 110) and 2 (output port 106), respectively, and $E_{3-}$ and $E_{4-}$ are the signals exiting ports 3 (116) and 4 (114).

As discussed above, MOFR 104, which rotates the plane of polarization of a linearly polarized wave, is located within the loop of the Sagnac interferometer 102 as shown in FIG. 1, and its effect can be described with a Jones matrix as $$\begin{pmatrix} E_{4x+} \\ E_{4y+} \end{pmatrix} = Te^{-j\phi} \begin{pmatrix} \cos\theta & -\sin\theta \\ \sin\theta & \cos\theta \end{pmatrix} \begin{pmatrix} E_{3x-} \\ E_{3y-} \end{pmatrix} \quad (2)$$

where T is the transmission coefficient, $\theta$ is the angle of Faraday rotation experienced by the wave, $\phi$ is the phase shift introduced by the wave traveling the thickness of the MOFR 112, and $E_x$ and $E_y$ represent the x and y components of an incident beam, respectively. Due to the non-reciprocal nature of Faraday rotation, $\theta$ will not have the same sign for the two counter-propagating waves traveling through the Faraday rotator 104 relative to their direction of propagation. $\theta$ will be considered positive when the beam travels from port 3 (116) to port 4 (114) and negative when the wave is traveling from port 4 (114) to port 3 (116), so that Equation 2 should be modified for the counter-propagating wave as $$\begin{pmatrix} E_{3x+} \\ E_{3y+} \end{pmatrix} = Te^{-j\phi} \begin{pmatrix} \cos\theta & \sin\theta \\ -\sin\theta & \cos\theta \end{pmatrix} \begin{pmatrix} E_{4x-} \\ E_{4y-} \end{pmatrix} \quad (3)$$

Within the magnetically linear region, the amount of Faraday rotation is proportional to the strength of the magnetic field 108 applied to the MOFR 104. The response is considered linear while the applied magnetic field 108 is less than the saturation field and the beam passes through a sufficient number of domains. The rotation in this region is described by $$\theta_{FR} = \theta_{sat} \frac{H_{app}}{H_{sat}} \quad (4)$$

where $H_{app}$ is the applied magnetic field and $\theta_{sat}$ is the rotation of the plane of polarization at the saturation field $H_{sat}$. Assuming no input at port 2 (output port 106), the output at each port can then be written as a function of the applied field 108 as $$\begin{pmatrix} E_{1-} \\ E_{2-} \end{pmatrix} = Te^{j\phi} \begin{pmatrix} jE_{1x+}\cos\left(\frac{H_{app}}{H_{sat}}\theta_{sat}\right)\hat{x} + jE_{1y+}\cos\left(\frac{H_{app}}{H_{sat}}\theta_{sat}\right)\hat{y} \\ -E_{1y+}\sin\left(\frac{H_{app}}{H_{sat}}\theta_{sat}\right)\hat{x} + E_{1x+}\sin\left(\frac{H_{app}}{H_{sat}}\theta_{sat}\right)\hat{y} \end{pmatrix} \quad (5)$$

where $E_{1x+}$ is the x component of the incoming wave, $E_{1y+}$ is the y component of the incoming wave, φ is the phase change experienced by both waves due to length of the loop, and T is the transmission coefficient through the MOFR 112. This means that the output at port 2 (output port 106) can be approximated as linear with respect to $H_{app}$ while $\theta_{sat} \cdot (H_{app})/(H_{sat})$ is small. In this region the system can be utilized as an optical modulator, with the output optical power proportionally related to the applied magnetic field 108. For large values of $H_{app}$, the field will still be modulated; however, the output response will be non-linear with respect to the applied field. As expected, when the wave experiences no rotation (θ=0), the transmitted power is returned to the input port 110 with a π/2 phase shift. If there is a 90° rotation through the Faraday rotator 104 (θ=90°) then the power is delivered to the output port 106 (port 2).

Using the Sagnac interferometer 102 for modulation offers a number of advantages. Since the interfering beams travel the same path (the Sagnac loop) there is no path length to match, unlike a Mach-Zehnder or Michelson interferometer, where matching path lengths between the two interferometric arms is required since nanometer differences in the path lengths cause deviations from the desired constructive or destructive interference. This Sagnac configuration offers high stability due to the short path length and inherently matched interferometric paths. This is particularly an advantage for being able to realize the modulator using fiber, where manufacturing differences between fibers can make it extremely difficult to create two paths of equal length. In addition, since both counter-propagating waves pass through a single MO material (Faraday rotator 104), the difference between the planes of polarization of the waves is 2θ, twice the difference achieved with a single MO material in other interferometric setups. This means that modulation can be achieved with lower magnetic fields, which in turn increases the achievable modulation frequency, and hence the switching speed achieved.

There are a number of factors which affect the modulator performance and speed which need to be considered in optimizing embodiments of the optical modulator of the present invention. Modulation speed is limited at the material level by the speed of domain wall motion. Traditionally, response time of magneto-optic materials has been slow (microseconds to hundreds of nanoseconds) as compared to electro-optic material's response time (subnanosecond). However, with the availability of optics-grade orthoferrites, the modulation time of this configuration, along with other magneto-optic devices, can be reduced and approach electro-optic response speeds.

At the circuit level, the switching speed is limited by the speed at which the magnetic field can be changed through the MOFR 104. In one embodiment, the MOFR 104 is placed within a coil 118 with the geometry shown in FIGS. 2a and 2b, inserted between the two optical fibers that comprise the Sagnac loop. It is desirable to maintain a compact geometry, keep operating voltages low, and produce fast switching speeds.

Figures 2A, 2B:
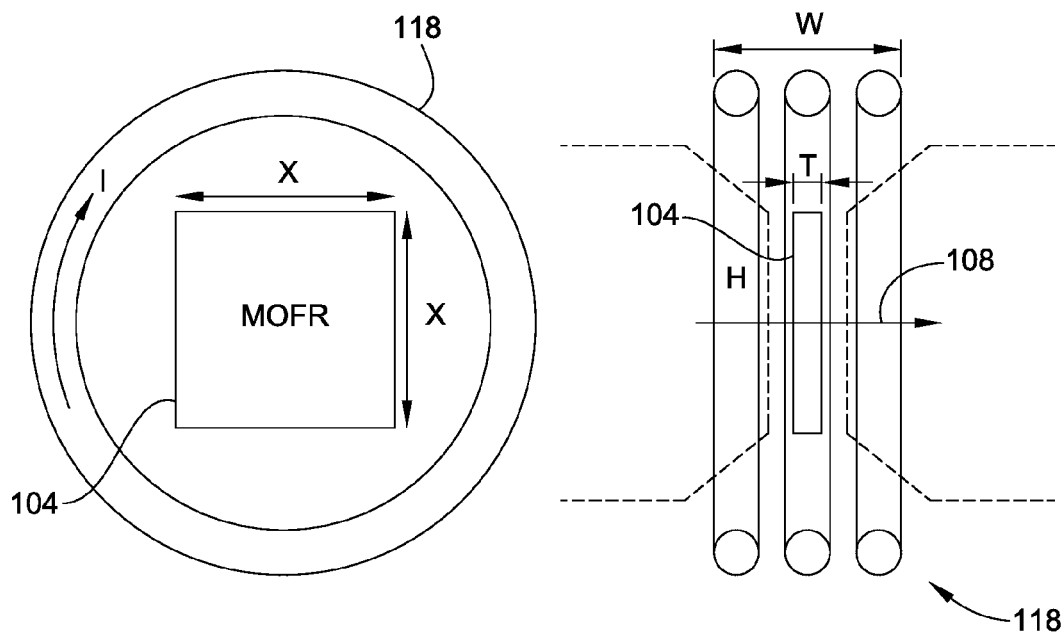
FIGS. 2a and 2b are a frontal and side view illustration, respectively, of a geometric configuration of a MOFR and coil arrangement illustrating aspects of an embodiment of a Sagnac interferometric modulator (switch)

For a MOFR 104 with a thickness T within a coil 118 with width W as shown in FIG. 2b, while T<<W the magnetic field 108 in free space inside the solenoid coil 118 can be approximated as H=NI/W, where N is the number of turns in the coil 118 and I is the current in the coil 118. The volume magnetic field energy related to the input current is $$\frac{1}{2}LI^2 = \frac{1}{2}\int\int\int B \cdot H dv = \left(\frac{1}{2}\mu_r\mu_0 X^2 T + \frac{1}{2}\mu_0 X^2 (W-T)\right)|H|^2 \quad (6)$$

where L is the inductance of the coil 118, B is the magnetic flux density in free space in the solenoid coil 118, H is the magnetic field 108 in free space in the solenoid coil 118, $\mu_r$ is the relative permeability of the MOFR 108, v is the volume within the solenoid coil 118, and X is the linear dimension of the MOFR 108 as illustrated in FIG. 2a. From this, the inductance of the solenoid coil 118 can be found for T<<W $$L = \frac{\mu_0 X^2 HN}{I} \approx \frac{\mu_0 N^2 X^2}{W} \quad (7)$$

To drive the current in the solenoid coil 118, the voltage needed is $$V = L\frac{dI}{dt} = \mu_0 NX^2 \frac{dH}{dt} \quad (8)$$

The current needed to drive the magnetic field 108 is described by $$I \approx \frac{B}{\mu_0}W \quad (9)$$

There are a number of tradeoffs when considering the coil 118 design. A single turn coil would keep the required voltage low; however, it would require large amounts of energy to maintain the high current that would be necessary. In order to generate a given magnetic field 108, the number of turns is inversely related to the current required and linearly related to the necessary voltage. In an alternate embodiment switching can also be achieved by a combination of parallel and series turns, with the former for turn on and the later for maintaining the current. This is also a way to achieve a latching-type switch electronically without pushing the MOFR 104 into saturation.

Figure 3:
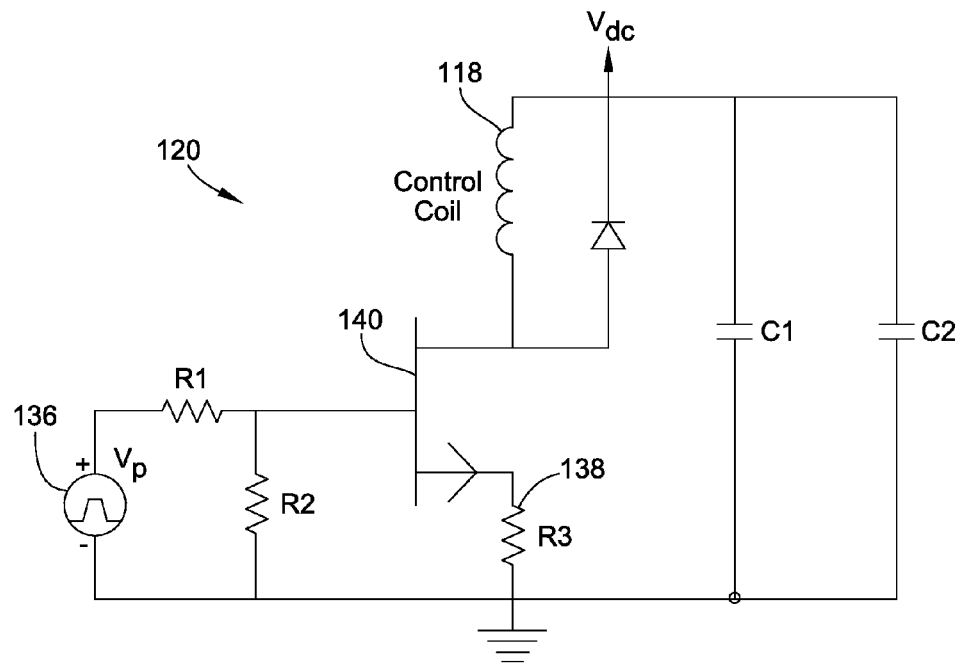
FIG. 3 is a simplified single line schematic diagram of an embodiment of a magnetic pulse control circuit usable in an embodiment of a Sagnac interferometric modulator (switch) utilizing Faraday rotation constructed in accordance with the teachings of the present invention.

In order to achieve a sufficiently large magnetic field 108 at reasonable voltages, the embodiment of the modulation or magnetic pulse control circuit 120 shown in FIG. 3 was constructed with the MOFR 104 placed within the control coil 118, as illustrated in FIG. 2. Vp is a voltage pulse supplied by an external pulse generator 136. In order to avoid heating issues in the feasibility demonstration unit, the circuit 120 was driven at a low duty factor, although such would not be necessary in an embodiment with heat sinking adequate to address any heating issues. R3 138 is a small resistor used to measure the rise time of the current in the control coil 118. The switching time is limited by the inductance of the control coil 118 and the switching speed of the transistor 140. In the embodiment of the circuit 120 illustrated in FIG. 3, the pulse generator 136 provides short pulses with a low duty factor to turn on transistor 140, which then allows current to flow through control coil 118 to generate the magnetic field. For an embodiment utilizing a non-latching configuration, the design of the control coil 118 has N turns in series with no turns in parallel.

Figure 4:
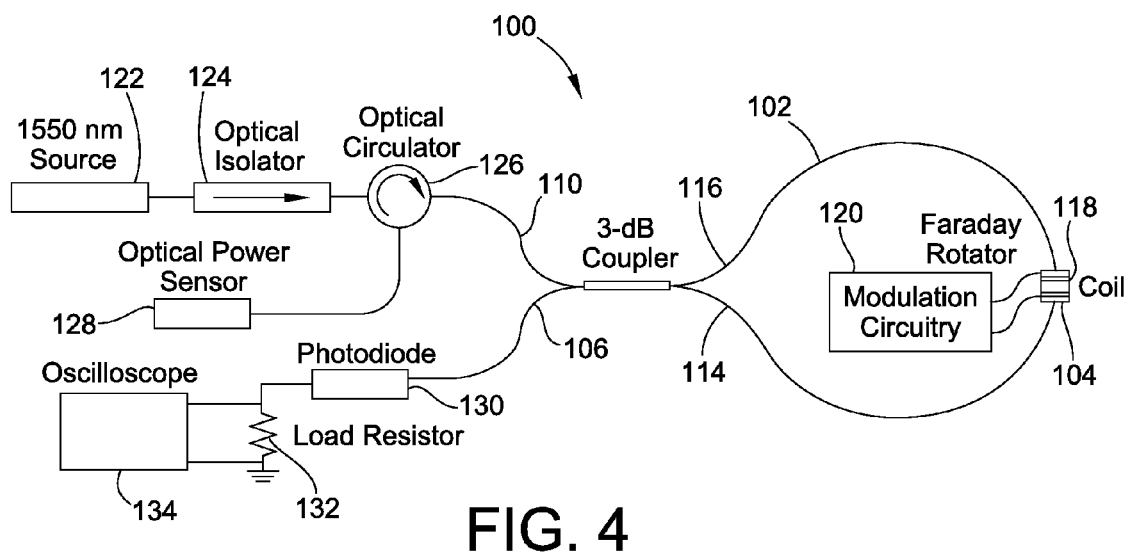
FIG. 4 is a simplified single line diagram of an experimental setup used to test an embodiment of the Sagnac modulator (switch)

As shown in FIG. 4, the magnetic field through the MO material of the Faraday Rotator 104 is created in one embodiment by the solenoid coil 118 which is driven by the external modulation circuit 120. On the circuit level, the modulation speed is limited by the L/R time constant associated with the inductance of the coil 118 with R being associated in part with the resistance of the transistor 140 (FET), the resistor 138, the series resistance of the capacitors C1 and C2, and the series resistance of the inductor 118. The spatial uniformity of the magnetic field also affects the modulation. Solenoid coil 118 design and optimization can help ensure uniformity and increase modulation or switching speeds. Insertion loss and reflections in the optical circuit can be reduced by using index-matching gel at the fiber-MO interfaces.

Because interferometry is based on interference, the operation of a Sagnac interferometer, as well as embodiments of the Sagnac switch 100 of the present invention, is greatly affected by reflections at the interfaces. In order to more appropriately model the switch's behavior, the reflection and transmission characteristics of the MOFR are considered. Assuming the reflection is polarization independent at the fiber-MO-fiber interface, the reflected portion of the wave at ports 3 (116) and 4 (114) is $$\begin{pmatrix} E_{R3+} \\ E_{R4+} \end{pmatrix} = \frac{1}{\sqrt{2}} \Gamma \begin{pmatrix} E_{1+} e^{-j2\phi_1} \\ j E_{2+} e^{-j2\phi_2} \end{pmatrix} \quad (10)$$

where $\Gamma$ is the reflection coefficient and $\phi_1$ and $\phi_2$ are the relative phases of the reflected wave at port 3 (116) and port 4 (114), respectively and are described by $\phi_1 = \beta_1 d_1$ and $\phi_2 = \beta_1 d_2$ where $d_1$ is the distance from port 3 (116) to the MOFR 104) and $d_2$ is the distance from port 4 (114) to the MOFR 104. The total output at port 2 (output port 106), including reflections at the interfaces, can be written as $$\begin{pmatrix} E_{2x-} \\ E_{2y-} \end{pmatrix} = \begin{pmatrix} -T e^{-j\phi} E_{1y+} \sin\theta + j\frac{1}{2} \Gamma E_{1x+} e^{-j2\phi_1} + j\frac{1}{2} \Gamma E_{1x+} e^{-j2\phi_2} \\ T e^{-j\phi} E_{1x+} \sin\theta + j\frac{1}{2} \Gamma E_{1y+} e^{-j2\phi_1} + j\frac{1}{2} \Gamma E_{1y+} e^{-j2\phi_2} \end{pmatrix} \quad (11)$$

where T is the transmission coefficient.

The refractive index of the MO at 1550 nm is 2.344 and approximately 1.5 for the fiber. The thickness of Faraday rotator 104 in one embodiment is 330 μm. In one embodiment, the MOFR 104 includes an index matching coating so that its index matches that of the fiber. Multiple MOFRs can be stacked within the coil 118 in order to reduce the magnetic field necessary to induce a rotation of 90° in the state of polarization. The total length of the loop is constant. It can be seen that that the ON-OFF extinction ratio is affected by the fiber length. Specifically, when no field is applied through the MOFR 104 in order to achieve an OFF state, the reflections play a greater role in deteriorating the ON-OFF extinction ratio. Therefore, in order to experimentally improve the extinction ratio, in the non-latching condition the output at port 2 (output port 106) should be minimized with no field applied. The ON-OFF extinction ratio will be maximized with the MO in this position.

Returning again to the experimental setup shown in FIG. 4, a bismuth substituted iron garnet [$(Bi_{1.1}Tb_{1.9})(Fe_{4.25}Ga_{0.75})O_{12}$] is used as the MOFR 104 and the bias magnetic field through it is controlled by the external modulation circuit 120. In this embodiment the Faraday rotator 104 is 330 μm thick, has a refractive index of 2.344 at 1550 nm, and has an anti-reflection coating on both sides in order to match the index of refraction of the MOFR to that of the fiber. The input to the optical circuit (switch 100) was a 1550 nm laser 122 which was connected to a fiber optical isolator 124 to prevent reflection back into the source 122. A fiber optical circulator 126 was used to measure power reflected back to the input port 110 by an optical power sensor 128. The output of the second port (output port 106) was connected to a photodiode 130, which was placed in series with a load resistor 132. The output was measured using an oscilloscope 134. Throughout the circuit, single mode fiber was used and mode field strippers were placed along the length of each fiber to reduce the effect of higher order modes.

Figure 5:
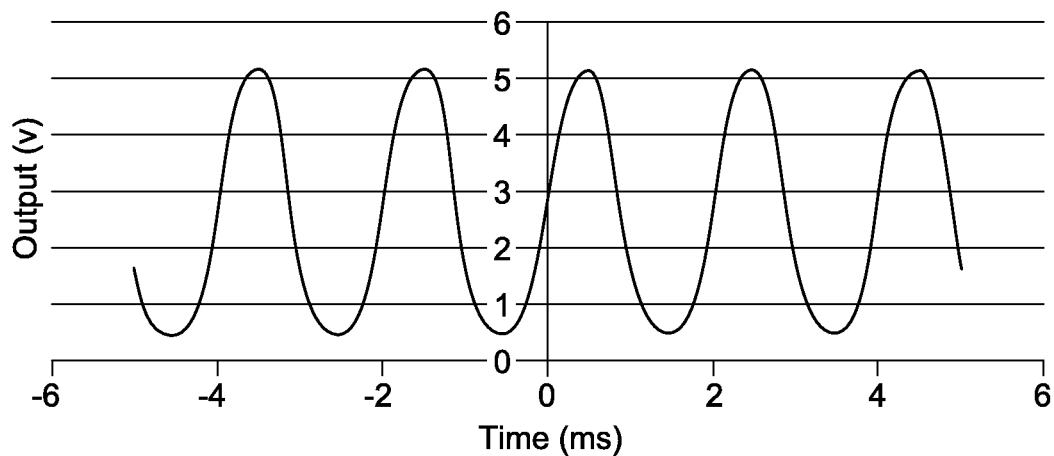
FIG. 5 illustrates experimental results from the setup of FIG. 4 of the output for a sine wave control signal.
Figure 6:
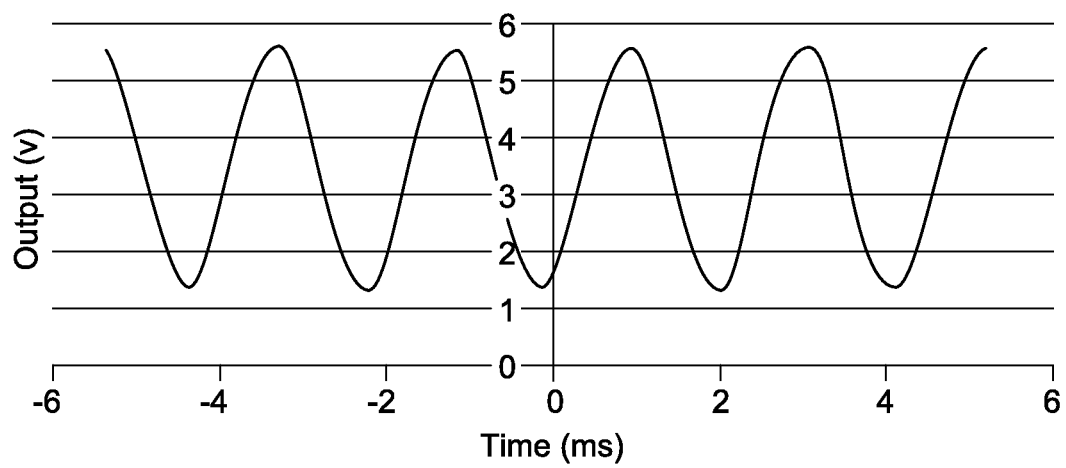
FIG. 6 illustrates experimental results from the setup of FIG. 4 of the output for a triangle wave control signal.
Figure 7:
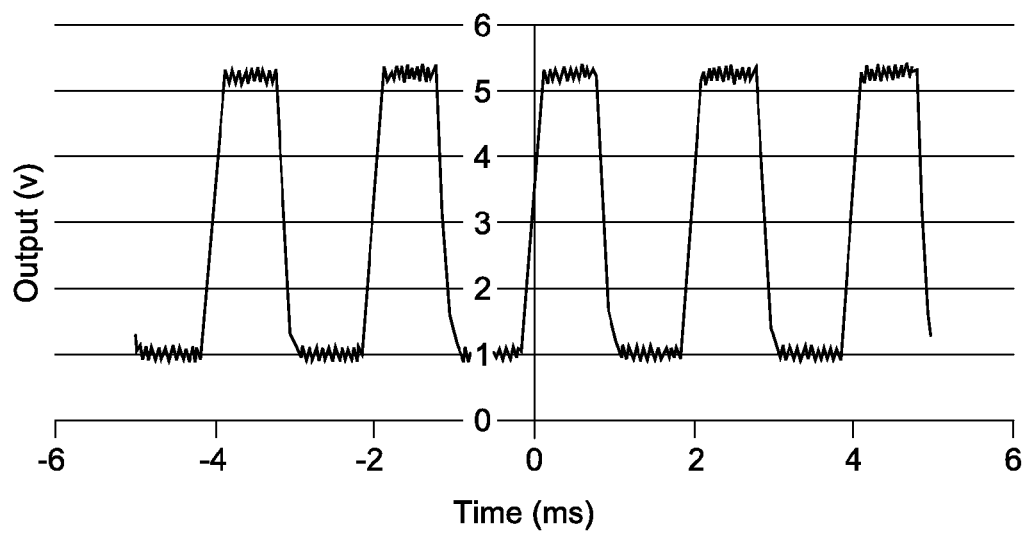
FIG. 7 illustrates experimental results from the setup of FIG. 4 of the output for a square wave control signal.

In one embodiment, the Faraday rotator 104 was placed in a coil 118 with a measured inductance of 1.118 mH at 1 kHz. For proof of concept, the control field was driven from 0 to 15 Oe at 500 Hz with different driving signals. The output for a sine, triangle, and square wave control signal is shown in FIGS. 5-7, respectively. The dynamic range for the sine, triangle, and square wave is 16.6 dB, 13.2 dB, and 13.5 dB, respectively. The dynamic range can be increased by applying a stronger magnetic field. However, this results in slower achievable modulation speeds.

There was some distortion in the current waveform used to generate the magnetic field due, in part, to the non-linearities in the transistor current driving circuit. Different circuit architectures can correct for this distortion. Additional non-linearities can arise from the amplitude dependence of the modulation field on the ferrite. This effect can be minimized by keeping the applied magnetic field small compared to the saturation field of the ferrite with the added benefit of avoiding hysteresis effects.

Figure 8:
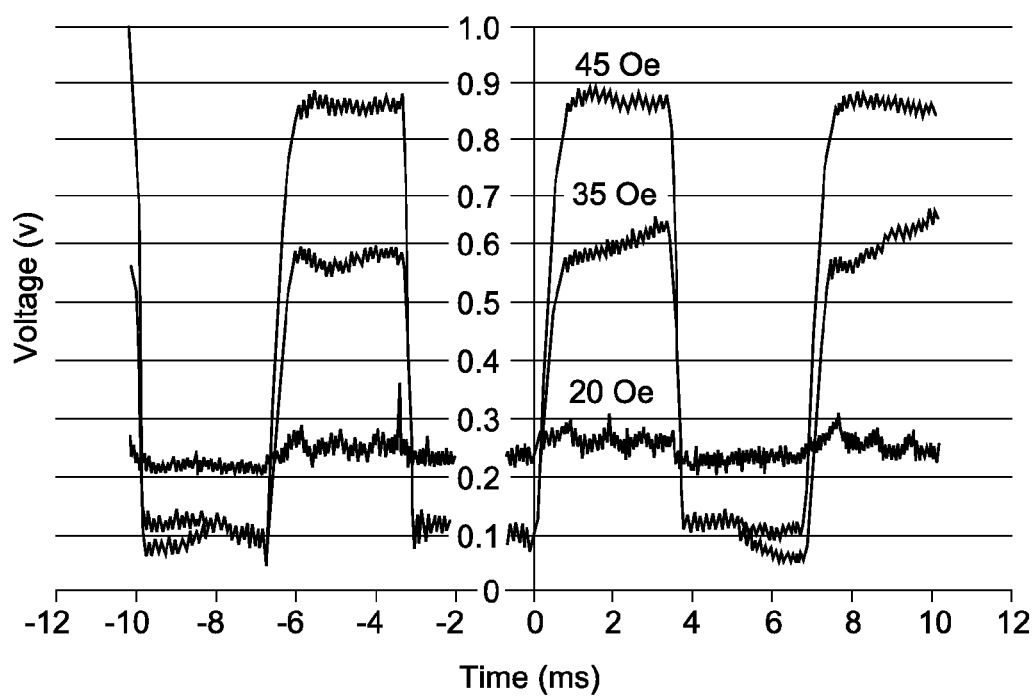
FIG. 8 illustrates experimental results of the output at port 2 of an embodiment of a Sagnac interferometric modulator (switch) utilizing Faraday rotation constructed in accordance with the teachings of the present invention utilizing single mode fiber (SMF) for different applied fields.

In an alternate embodiment, the magnetic field through the MOFR 104, controlled by the external circuit 120, is a square wave driven from 0 to 45 Oe at 150 Hz. In order to achieve the 90° rotation, two MOFR samples are used as the MOFR 104 in such an embodiment. The output power was detected with a photodetector connected to an oscilloscope similar to the experimental setup illustrated in FIG. 4. The experiment was carried out with both single mode fiber (SMF) and multimode fiber (MMF). In the case of the MMF, only the Sagnac loop was MMF. The output of the photodetector is shown in FIG. 8 for different fields applied to the MOFR 104.

As expected, when a magnetic field is applied, the power is increased at the output port 106. For SMF, there is a 15 dB ON-OFF extinction ratio with a 45 Oe field. The rotation $\theta_{FR}$ experienced by the beam is described by $\theta_{FR}=(H_{app}/H_{sat})\theta_{sat}$, where $H_{app}$ is the applied field, $H_{sat}$ is the saturation field, and $\theta_{sat}$ is the rotation at the saturation field. Therefore, as the magnetic field increases, the rotation increases and the extinction ratio improves. With MMF, the extinction ratio is 16 dB with an applied field of approximately 50 Oe.

In an embodiment utilizing the modulation or magnetic pulse control circuit 120 of FIG. 3, the number of turns in control coil 118 was N=3, with Vdc=10 V and Vp=10 V. For measurement purposes, R3 was chosen to be 1.2Ω. The current through the coil 118 was approximately 3.5 A to achieve a field of 40 G within the solenoid. In order to keep the fibers aligned, the fibers and MOFR 104 are all within a modified optical connector, which the control coil is wrapped around. A transresistance amplifier was built to measure the response of the photodiode 130. The measurement of the switching time is limited by the photodiode rise time, the RC time constant associated with the measurement, and the switching speed of the transistor. Special attention must be paid to the capacitance of the photodiode and other parasitics of the measurement circuit at high speed. For the shown configuration, measurement of the optical response was limited to approximately 100 ns rise time.

Figure 9:
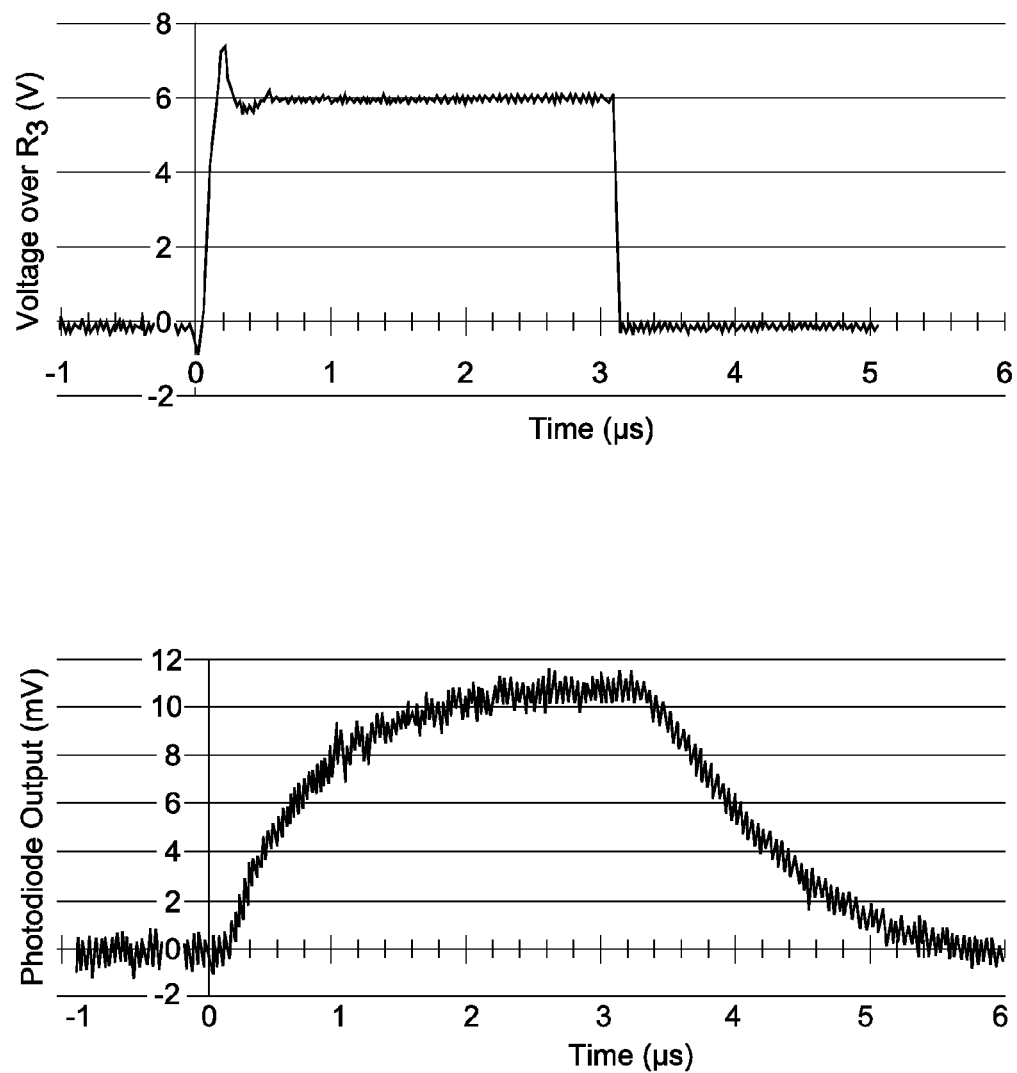
FIG. 9 illustrates experimental results of the measured magnetic pulse and the measured optical pulse of an embodiment of a Sagnac interferometric modulator (switch) utilizing the magnetic pulse control circuit of FIG. 3 to generate Faraday rotation constructed in accordance with the teachings of the present invention.

With these measurement limitations in mind, FIG. 9 shows the measured magnetic pulse and the measured optical switching response. The voltage measured over the R3 138 in the control circuit 120 indicates the rise time of the current in the coil 118 and therefore, of the magnetic field. The optical output was measured with the measurement circuit as discussed previously.

As shown, the rise time of the current in the solenoid coil 118 is approximately 75 ns. The rise time of the optical response is significantly slower; largely due to the domain wall velocity within the MOFR 104. The measured rise time is approximately 750 ns. Considerable switching time improvements are realized in alternate embodiments that do not utilize low operating voltage, but instead uses high voltage to increase switching time. Specialized coil design used in an alternate arrangement could also increase the switching time, as proposed in J. W. Tioh, M. Mina, and R. J. Weber, "Field coil for magneto-optic switching: Capacitance considerations," *IEEE Trans. Magn.*, vol. 44, pp. 3843-3846, 2008, the teachings and suggestions of which are incorporated herein in their entireties by reference thereto.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. For example, from the foregoing description those skilled in the art will recognize that optical rotators can be placed on port 1 and port 2 of the embodiment shown in FIG. 1 to achieve a 2×2 switching configuration. Moreover, any combination of the above-described elements in all possible variations thereof is encompassed by the invention unless otherwise indicated herein or otherwise clearly contradicted by context.

What is claimed is:

1. An optical switch, comprising:
a Sagnac interferometer having an input port and an output port coupled to a Sagnac loop through an optical coupler configured to split an incoming optical signal into two counter-propagating waves around the Sagnac loop;
a magneto-optic Faraday rotator (MOFR) interposed in the Sagnac loop, wherein the MOFR is a bismuth substituted iron garnet Faraday rotator;
a magnetic circuit associated with the MOFR; and
wherein modulation of the magnetic circuit via current flow that is switched in approximately 100 ns operates to turn the optical switch on and off.

2. The optical switch of claim 1, wherein the optical coupler is a 3-dB coupler configured to introduce a $\pi/2$ phase shift between the two counter-propagating waves.

3. The optical switch of claim 2, wherein when the magnetic circuit is off, destructive interference between the two counter-propagating waves occurs at the output port such that the optical power is directed to the input port.

4. The optical switch of claim 2, wherein when the magnetic circuit generates a magnetic field, constructive interference between the two counter-propagating waves occurs at the output port such that optical power is delivered to the output port.

5. The optical switch of claim 4, wherein the magnetic circuit generates a first magnetic field of a magnitude such that the MOFR is saturated to latch the optical switch on.

6. The optical switch of claim 5, wherein the optical switch remains on after the first magnetic field is removed.

7. The optical switch of claim 5, wherein the magnetic circuit generates a second magnetic field of opposite polarity to the first magnetic field to unlatch the optical switch to turn the optical switch off.

8. The optical switch of claim 4, wherein the magnetic circuit generates a first magnetic field of a magnitude such that the MOFR is not saturated to turn the optical switch on.

9. The optical switch of claim 1, wherein the Sagnac loop comprises single mode fiber (SMF).

10. The optical switch of claim 1, wherein the Sagnac loop comprises multimode fiber (MMF).

11. The optical switch of claim 1, further comprising index-matching gel included at interfaces between the Sagnac loop and the MOFR.

12. The optical switch of claim 1, wherein the magnetic circuit comprises a coil in magnetic communication with the MOFR.

13. The optical switch of claim 12, wherein the coil includes at least one turn around the MOFR.

14. The optical switch of claim 12, wherein the coil includes a plurality of series turns around the MOFR.

15. The optical switch of claim 14, wherein the coil further includes a plurality of parallel turns around the MOFR.

16. The optical switch of claim 12, wherein the magnetic circuit further comprises a modulation circuit operably coupled to the coil to supply current thereto so as to control generation of a magnetic field produced by the coil.

17. The optical switch of claim 16, wherein the modulation circuit operates to switch current flow through the coil in less than 100 ns.

18. The optical switch of claim 1, wherein the MOFR comprises a plurality of individual MOFRs stacked together.

19. The optical switch of claim 1, further comprising an input optical rotator placed on the input port and an output optical rotator placed on the output port to provide a 2×2 switching configuration.

20. An optical switch, comprising:
   a Sagnac interferometer having an input port and an output port coupled to a Sagnac loop through an optical coupler configured to split an incoming optical signal into two counter-propagating waves around the Sagnac loop;
   a magneto-optic Faraday rotator (MOFR) interposed in the Sagnac loop;
   a magnetic circuit associated with the MOFR; and
   wherein modulation of the magnetic circuit operates to turn the optical switch on and off;
   wherein the magnetic circuit comprises a coil in magnetic communication with the MOFR; and
   wherein the magnetic circuit further comprises a modulation circuit operably coupled to the coil to supply current thereto so as to control generation of a magnetic field produced by the coil; and
   wherein the modulation circuit comprises a pulse generator driving a switching transistor that provides a path for current flow through the coil.

21. An optical switch, comprising:
   a Sagnac interferometer having an input port and an output port coupled to a Sagnac loop through an optical coupler configured to split an incoming optical signal into two counter-propagating waves around the Sagnac loop;
   a magneto-optic Faraday rotator (MOFR) interposed in the Sagnac loop;
   a magnetic circuit associated with the MOFR; and
   wherein modulation of the magnetic circuit operates to turn the optical switch on and off;
   wherein the magnetic circuit comprises a coil in magnetic communication with the MOFR; and
   wherein the magnetic circuit further comprises a modulation circuit operably coupled to the coil to supply current thereto so as to control generation of a magnetic field produced by the coil; and
   wherein the modulation circuit operates to switch current flow through the coil in approximately 100 ns.

* * * * *